3,185,991
INK SUPPLY SYSTEM FOR RECORDING APPARATUS

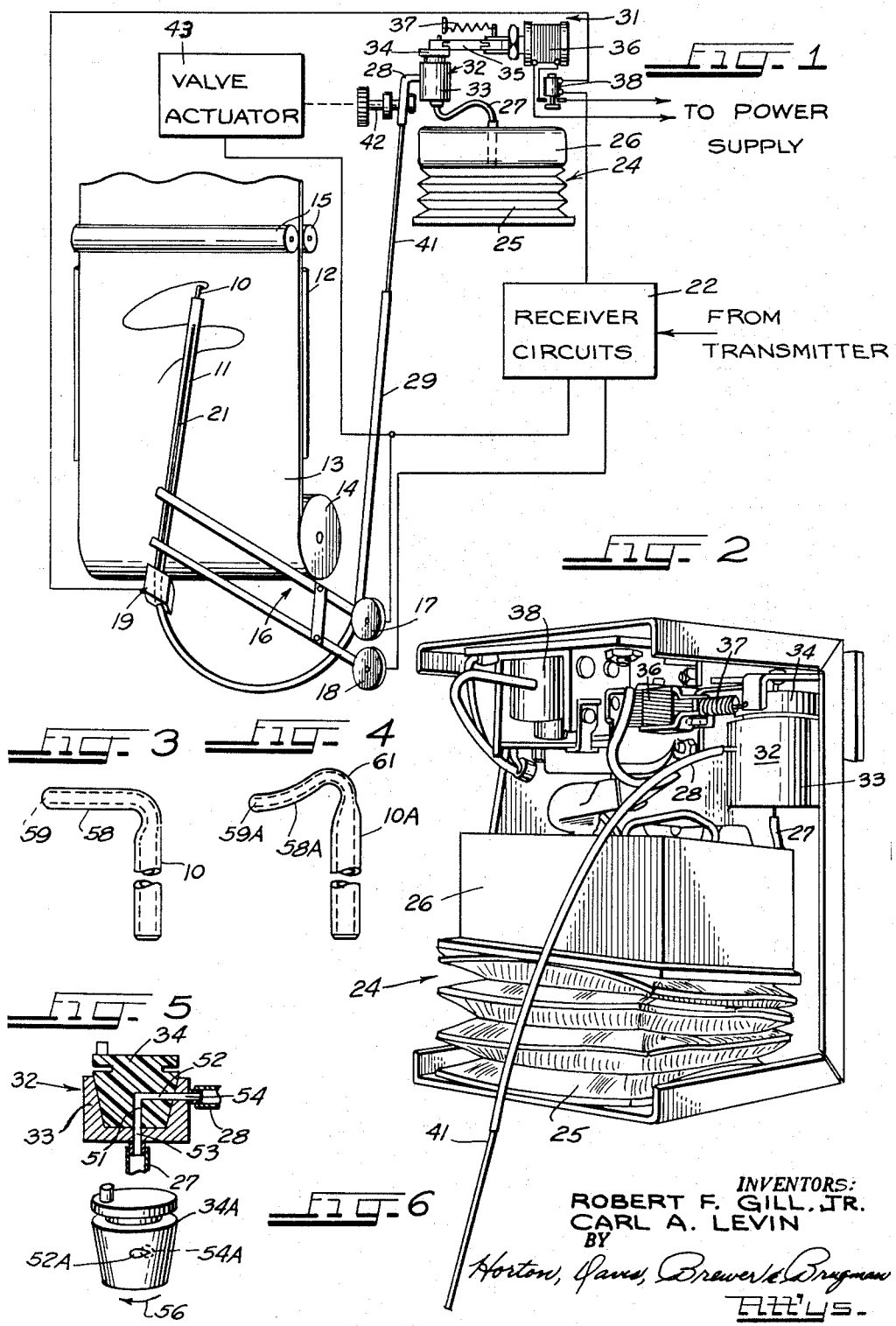

Robert F. Gill, Jr., La Grange, and Carl A. Levin, Park Ridge, Ill., assignors, by mesne assignments, to Victor Comptometer Corporation, Chicago, Ill., a corporation of Illinois
Filed Feb. 2, 1961, Ser. No. 86,699
3 Claims. (Cl. 346—140)

This invention relates to a new and improved recording apparatus and more particularly to a new and improved ink supply system for a graphic communication system recorder in which the recording pen is moved substantially omnidirectionally and may be subjected to substantial acceleration, particularly in a vertical direction.

In graphic communication systems, the movement of a recording pen at either the transmitter or receiver station may be relatively rapid and irregular and may subject the pen to substantial and varying acceleration. This is especially true when the system is used for transmission and recording of rapidly-drawn sketches or when the system operator writes a message quite rapidly. Moreover, the pen may frequently be moved into and out of contact with the recording medium to differentiate between words or for other purposes in delineating the data being transmitted and recorded. If a liquid ink is used and the pen is accelerated in a direction transverse to the ink conduit, there is no substantial interference with the feeding of ink to the pen. On the other hand, if the pen is subjected to substantial acceleration in a direction parallel to the ink conduit and away from the ink source, the supply of ink to the pen may fail. This problem is accentuated where the recording surface is vertically oriented. Under these circumstances, a part of the data may be omitted in the reproduction or excessive ink feeding may occur. As a result, the recording may be unintelligible.

In recording upon a substantially horizontal surface, one which is inclined to the horizontal by an angle of less than 30°, a highly uniform flow of ink can be achieved by incorporating a small reservoir in the pen structure, located beyond the nib of the pen, to supply ink to the pen when it is accelerated away from the ink supply. A pen structure of this kind is described and claimed in the co-pending application of Robert F. Gill, Jr., and Peter G. S. Mero, Serial No. 842,693, filed September 28, 1959, now Patent No. 3,096,742. The pen reservoir construction set forth in that application can also be utilized for high-speed recording upon a vertical writing surface, provided vertical displacement is quite limited. Where large vertical displacements are required, however, variations in the effective ink supply at the pen frequently cause skipping or flooding during the recording operation.

It is a principal object of the present invention, therefore, to eliminate or at least minimize the effects of acceleration and vertical displacement of the pen upon the supply of ink to the pen in a graphic communication recorder having a vertical writing surface of practical size.

A further object of the invention is to provide an ink supply system for a graphic communication recorder which delivers a constant flow of ink to the recording pen, regardless of movements of the pen in a vertical direction, over a substantial period of time and independently of reduction in the total supply of ink available.

A related object of the invention is to provide a constant-flow ink system for a graphic communication recorder having a substantially vertical recording surface and to eliminate any necessity for frequent refilling of the ink supply system despite a high level of activity in the use of the recorder.

Another object of the invention is to provide for convenient and effective regulation of the dynamic pressure or flow of ink to the pen in a graphic communication recorder to permit a wide range of recording speeds in conjunction with the deposition of ink upon the recording surface of a graphic communication recorder. In particular, it is an object of the invention to reduce the drying time for the ink, in a graphic communication recorder, to a minimum.

Accordingly, the present invention pertains to an ink supply system for a graphic communication recorder of the kind comprising a recording pen, means for moving the pen omnidirectionally across a recording surface, which may be vertically oriented, and means for moving the pen toward and away from the recording surface between a recording position and a non-recording position. The ink supply system comprises ink reservoir means for storing a supply of ink under an essentially constant static pressure. A conduit, usually flexible, connects the ink reservoir means to the recording pen. Preferably, this conduit includes a fixed high-resistance portion for restricting the ink flow through the conduit to a given maximum rate; the system also provides for the use of an adjustable flow restricting means effective to regulate the ink flow to the pen. Valve means are interposed in the conduit between the ink reservoir and the pen and are actuated to open the conduit whenever the pen is moved to its recording position and to close off the conduit when the pen moves to its non-recording position. Preferably, the entire ink supply system is enclosed except for the outlet opening at the pen, although this is not essential to the invention.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a simplified elevation view of an ink supply system for a graphic communication recorder constructed in accordance with one embodiment of the invention and includes a schematic diagram of certain electrical control components for the system;

FIG. 2 is a perspective view of a portion of the apparatus of FIG. 1;

FIG. 3 illustrates a typical pen construction which may be utilized in conjunction with the ink supply system of the invention;

FIG. 4 illustrates an alternative pen construction;

FIG. 5 is a detail sectional illustration of a particular valve employed in the system of FIG. 1; and FIG. 6 shows a modified form of valve plug that may be used in the valve of FIG. 5.

FIG. 1 illustrates, in substantially simplified form, a graphic communication system receiver including an ink supply system constructed in accordance with the present invention. The receiver comprises a recording pen 10 that is mounted upon a pen arm 11. The pen 10 is aligned with a vertical recording surface comprising a platen 12 covered by a suitable recording medium 13. The recording medium 13, which may comprise paper or other suitable recording material, is fed from a supply roll 14 across the platen 12 and through a pair of feed rollers 15, the apparatus being arranged to hold the paper 13 in contact with the surface of the platen 12. The recording surface defined of the platen 12, that surface covered by the recording medium 13, is vertically oriented, although it need not extend exactly normal to the horizontal. In this connection, it should be noted that the ink supply system of the present invention is particularly advantageous as applied to a recorder in which the recording surface is inclined at a substantial angle to the horizontal, usually in excess of 30°, but the invention can also be utilized with recorders having generally horizontal recording surfaces.

The recording apparatus further includes means for moving the pen 10 omnidirectionally across the recording surface of the platen 12. This means may be of conventional construction and, accordingly, is illustrated only diagrammatically in the drawing. Thus, the pen moving means, as illustrated, comprises a pantograph 16 connected to the pen support arm 11 and actuated by a pair of drive motors 17 and 18. Preferably, the pantograph 16 is of the zero-mutual-inertia type described and claimed in Patent No. 2,583,535 to Robert Adler, issued January 29, 1952, although other pen moving apparatus may be utilized to drive the pen 10 across the recording surface if desired. In the description of the ink supply system set forth hereinafter, it is assumed that the motor 17 is utilized to control movement of the pen 10 in a generally vertical direction, whereas the motor 18 is used to actuate the pen for movement in a horizontal direction.

Additional means are provided for moving the pen 10 toward and away from the recording medium 13 on the surface of platen 12. This additional pen moving means may comprise a solenoid or other electrically actuated device 19 that is mechanically connected to the pen by suitable means, in this instance a connecting wire 21. The device 19, sometimes referred to hereinafter as a pen-lift or pen-contact device, could be mounted immediately adjacent the pen 10, but this is undesirable because it adds unduly to the weight of the pen. Thus, it is usually preferable to mount the pen-lift device 19 at the end of the arm 11 opposite the pen 10 to serve as a counterweight for the pantograph 16.

A suitable electrical control mechanism is provided to energize the devices 17–19 to move the pen 10 across the surface of the recording medium 13 and into and out of contact with the recording medium. Inasmuch as control apparatus of this kind is generally well known in the art, and is not critical to the present invention, it is illustrated generally by the receiver circuits 22. The receiver circuits 22 include the usual demodulating and amplifying circuits for translating a received graphic communication signal into the usual vertical control, horizontal control, and pen contact control signals necessary to actuate the devices 17, 18 and 19 respectively. Thus, the pen actuating devices 17, 18 and 19 are illustrated as being provided with individual electrical connections to the receiver circuits 22. For a suitable form of receiver circuit arrangements, reference may be had to Patent No. 2,649,503 to Robert Adler, issued August 18, 1953.

The receiver or recorder apparatus illustrated in FIG. 1, as thus far described, is generally conventional. Accordingly, only a brief description of the operation of the receiver is deemed necessary. A suitable graphic communication signal from a transmitter is supplied to the receiver circuits 22 and is demodulated to develop a vertical control signal, a horizontal control signal, and a pen-contact signal. The vertical control signal is supplied to the motor or driving device 17 to actuate the pantograph 16 and control movements of the pen arm 11 in a vertical direction. In this manner, the pen 10 is moved vertically in accordance with corresponding movements of a transmitter stylus. Similarly, the horizontal control signal is supplied to the motor 18 to actuate the pantograph 16 and control horizontal movements of the pen 10. The pen-contact signal is supplied to the solenoid or other pen-contact device 19 to move the pen 10 into and out of contact with the recording medium 13 on the recording surface of the platen 12 in coordination with corresponding movements of the transmitter stylus. Thus, the pen 10 reproduces a message, sketch, or other data simultaneously with a recording thereof at the transmitter. Of course, other operating circuits and devices would ordinarily be included in the receiver; for example, means would usually be provided to advance the paper 13 whenever a paper advance occurs at the transmitter. Inasmuch as auxiliary operating devices of this kind are not essentially related to the present invention, they have not been shown in the drawings.

The ink supply system of FIG. 1, which comprises the subject matter of the present invention, is shown in greater detail, with respect to some portions thereof, in FIG. 2. As illustrated in these figures, the ink supply system includes ink reservoir means 24 for storing a supply of ink under an essentially constant static pressure. A preferred form of ink reservoir includes a compressible resilient ink storage chamber 25. The ink storage chamber 25 is constructed in the form of a bellows; a weight 26 is mounted on the bellows to maintain the desired constant hydrostatic head on the contents of the storage chamber. Of course, it is not essential that a weight be utilized for this purpose; for example, a compound constant-stress spring system of conventional design may be employed. Other constant-pressure mechanisms could also be employed, although none has been found to be mechanically simpler or economically more attractive than the preferred form illustrated in FIGS. 1 and 2.

The ink supply system further includes a conduit which connects the ink reservoir means 24 to the recording pen 10. There are several sections to the conduit including, in series, a first conduit section 27, a second conduit section 28, and a third conduit section 29. The third and final conduit section 29 terminates in a portion which extends along the pen arm 11 and is connected directly to the pen 10.

Valve means are interposed in the ink conduit, between the sections 27 and 28, for closing the conduit whenever the pen 10 is moved away from the paper 13 to a nonrecording position and for opening the conduit whenever the pen moves back to its recording position in engagement with the paper on the recording surface of the platen 12. The valve means 31 includes a turncock valve 32 including a housing 33 and a rotary valve plug 34 opening and closing of the valve being accomplished by rotational movement of the plug 34 as described more fully hereinafter in connection with FIG. 5. The valve means 31 further includes a drive linkage 35 of conventional form connecting the turncock 34 to a solenoid actuator 36. A spring 37 is used to bias the linkage 35 to hold the turncock plug 34 in a closed position, the valve being opened by action of the solenoid 36, against the spring bias, when the solenoid is energized. The energizing circuit for the solenoid 36 includes a relay 38 having its operating coil connected to the receiver circuits 22 for energization by the pen-contact signal that is also employed to actuate the pen-contact device 19 as described hereinabove.

The ink supply system further includes fixed resistance means for restricting ink flow to a predetermined maximum and an adjustable resistance means for further restricting the ink flow. The fixed resistance may be constructed in a number of different ways, but the preferred form illustrated in FIGS. 1 and 2 comprises a length of corrosion-resistant metal tubing 41 that is interposed in the ink conduit between the conduit sections 28 and 29. The fixed resistance conduit portion 41 may, for example, be formed from one of the readily available 300-series stainless steels. The bore of the resistance tubing should be smooth in order to avoid turbulence and should be substantially smaller in internal diameter than the main portions 27–29 of the ink conduit in order to offer greater resistance to the ink flow. The fixed resistance is conveniently made of a straight section of tubing; if necessary, however, the tubing may be curved or coiled as long as turbulence is avoided in the ink flow.

The adjustable ink flow resistance means, in the system illustrated in FIG. 1, comprises a clamp-type valve 42 positioned to engage the flexible section 28 of the ink conduit. The variable resistance device 42, in its simplest form, may be a conventional manually operable screw clamp which flattens out a short section of the ink line 28, the degree of flattening determining the flow resistance afforded by this portion of the ink conduit. In most instances, manual adjustment of a simple screw clamp is sufficient to permit accurate and adequate control of the rate of ink flow to and through the pin 10. It may be desirable, however, to provide for automatic variation of the ink flow in response to vertical movement of the pen 10. This may be accomplished by means of an electrically controlled valve actuator 43 mechanically connected to the adjustable clamp-type valve 42 and electrically connected to the receiver circuits 22. More specifically, the valve actuator 43 may be controlled by the vertical drive signal from the receiver circuits 22, or by a suitable signal derived from the vertical drive motor 17, to vary the effective aperture at the valve 42 in accordance with vertical acceleration or velocity of the pen. Of course, it is not essential that a clamp-type valve such as the device 42 be employed for this purpose; other valves such as conventional needle valves or stopcock valves may be utilized if desired. The valve actuator 43, on the other hand, may be generally similar to the actuating means included in the shut-off valve means 31.

In considering operation of the ink supply system of FIGS. 1 and 2, it may be assumed that a substantial quantity of ink is first deposited in the resilient compressible ink storage chamber 25, which is then closed and connected to the conduit section 27. The weight 26 maintains the ink under a relatively high static pressure and, when the valve 32 is opened, ink flows from the reservoir means 24 through the various sections of the conduit to the pen 10. The rate of ink flow is limited by the fixed resistance 41 to a predetermined maximum to prevent flooding of ink, through the pen 10, on to the paper or other recording medium 13. In initiating operation of the system, the solenoid 36 may be energized, or the valve 32 may be opened manually, for a period of time sufficient to prime the pen, following which the system is capable of operation.

One further adjustment is required, in the system of FIG. 1, before the ink supply system is completely ready for use. The fixed resistance 41 in the ink conduit limits the ink flow to a predetermined maximum rate, so that flooding does not occur. On the other hand, it is usually desirable to adjust the ink flow to a somewhat lesser rate, and this is accomplished by means of the adjustable resistance device 42. Using a simple screw clamp valve, as shown in FIG. 1, this adjustment may be made manually. If an automatic variable resistance is provided, it is still desirable to afford some means for manual adjustment to control the initial ink flow rate.

With the ink supply system adjusted as described hereinabove, operation of the graphic communication receiver is initiated upon actuation of the receiver circuits 22 by a suitable transmitted signal. The valve 32 is normally held in closed position by the spring 37, so that transverse movement of the pen 10, in response to received signals, does not result in spattering of ink across the paper 13. Each time the pen-contact signal developed by the receiver circuits 22 actuates the pen-contact device 19 to move the pen to its recording position, however, the relay 38 is actuated, energizing the solenoid 36. Energization of the solenoid 36 actuates the linkage 35 to rotate the turncock 34 and open the valve 32. Thus, ink flows under a constant hydrostatic head from the reservoir means 24 to the pen 10 whenever the pen is in its recording position, but ink flow is interrupted each time the pen moves away from the paper 13 to its non-recording position. As noted hereinabove, the fixed and variable resistance devices 41 and 42 provide an essentially even self-limiting flow of ink on to the writing surface regardless of variations in the elevation of the pen 10 with respect to the reservoir means 24.

For optimum operation of the ink system of FIGS. 1 and 2, it is essential that certain operating characteristics be obtained in the valve 32. Thus, it is not desirable to use a valve which causes any substantial "upstream" or "downstream" displacement of the ink upon opening and closing of the valve. If the valve action does cause any substantial displacement of the ink supply through the conduit, momentary flooding may occur when the pen 10 engages the paper and the valve opens or an insufficient ink supply may be presented at the pen when the pen first contacts the paper. A turncock or plug-type valve is preferably employed for the valve 32, as described hereinabove, a preferred construction being shown in cross section in FIG. 5. As illustrated therein, the turncock or plug 34 is mounted within the housing 33 and includes a pair of intersecting passageways 51 and 52. When the turncock 34 is in the "open" position for the valve, as shown in FIG. 5, the passageways 51, 52 connect the inlet and outlet ports 53 and 54 of the valve housing 33. The ports 53 and 54 are connected, of course, to the conduit sections 27 and 28. Rotational movement of the turncock 34 closes the valve with what amounts to a shearing action, relative to the ink filling the passageways within the valve. Consequently, there is essentially zero displacement of the ink upon closing of the valve and upon opening of the valve.

The materials from which the valve 32 is constructed should be unaffected by the writing fluid, so that corrosion cannot affect operation of the valve. Preferably, the operating members of the valve should have a low co-efficient of friction with respect to each other so that only a small force is necessary to operate the valve. The valve members should be of exceptional dimensional stability so that the valve can be constructed to afford no more than negligible leakage over long periods of time. Furthermore, the valve structure should require little or no lubricant, or sealant, since lubricating or sealing materials may partially obstruct the very small valve passages or the associated ink conduit. These objectives are all realized with the construction illustrated in FIG. 5, particularly when the valve is formed with a stainless steel housing or body 33 and a turncock 34 fabricated from a fluorinated hydrocarbon plastic. Plastics of this kind are not "wetted" by most inks so that little or no lubricant is needed and leakage is negligible. The friction in this construction is exceedingly low; consequently, only a small solenoid or similar device is required to operate the valve and the high-speed response required for rapid recording operations is easily achieved.

In any system in which the recorder is subject to substantial use, the zero-displacement valve 32 of FIG. 5, or a valve having similar displacement characteristics, is preferred. In some applications, however, the graphic recorder may be required to stand idle for substantial periods of time. It may then be desirable to provide a very small "downstream" displacement upon opening of the valve to prime the pen. This is necessary because, under relatively dry conditions, the ink level at the pen may retract slightly from the pen orifice due to losses through evaporation. As a consequence, the initial portion of a transmitted message might be lost due to lack of ink at the pen nib. To accomplish this pen priming operation, a solenoid-actuated normally closed needle valve may be substituted for the turncock valve 32; the valve should be selected to afford a relatively small "downstream" displacement in order to avoid flooding of the recording surface. Since valves of this kind are available commercially, this particular valve construction has not been shown in the drawings.

The same priming effect, providing a slight excess of ink on the first downstroke of the pen, may be accomplished by modifying the construction of the valve plug 34 as shown in FIG. 6. The plug 34A illustrated therein, is provided with an outlet passage 52A that is not circular in cross section, but rather is of "teardrop" shape. In FIG. 6, the location of the outlet port in the valve housing is indicated by the dash outline 54A. The valve is opened by rotating the turncock 34A in the direction indicated by the arrow 56, moving the turncock passage 52A past the outlet port 54A to the illustrated position. In the course of this movement, it is seen that the initial effective cross-sectional area of the valve passage, when the valve is first opened, is larger than the passage with the valve completely closed. With this construction, therefore, a slight priming action is effected upon opening of the ink supply valve.

FIG. 3 illustrates a simple and inexpensive form of the pen 10 for the system of FIG. 1. The pen 10, as shown in FIG. 3, may be readily fabricated from commercially available corrosion-resistant metal tubing. For example, No. 302 stainless steel tubing may be employed. A nib 58 is formed at the end of the pen by swaging a length of the tubing to a relatively small diameter, after which the tip of the pen is finished by conventional methods such as spinning, grinding, and polishing. Finally, the 90° bend between the nib 58 and the main body of the pen 10 is formed. In the forming of the nib 58, the metal is preferably work-hardened so that a hard and wear-resistant tip is produced. The diameter of the orifice 59 at the tip of the nib 58 must be quite small; for example, the pen orifice may be of the order of 0.007 inch or smaller, although somewhat larger orifices may be utilized. Selection of the orifice size depends upon the desired width of the line to be recorded by the pen.

Because the pen 10 illustrated in FIG. 3 has a nib 58 which is generally horizontal, there may be a tendency for the ink to flow back along the external surface of the pen and down along the pen arm into the operating mechanism for the pen. To prevent ink flow along the external surface of the pen, the nib 58 is coated to inhibit wetting of the nib by the ink. In most instances, an aqueous ink solution is employed. Consequently, a suitable coating may comprise a hydrophobic material, such as a silicone. Alternatively, the nib may be encased in a short length of thin fluorinated hydrocarbon resin to afford the desired inhibiting coating. This treatment is also effective to prevent the accumulation of a mixture of ink and paper lint or dust at the tip of the pen, which would otherwise produce an undesirable broadening of the recorded line.

FIG. 4 illustrates an alternative pen construction 10A in which the nib portion 58A is provided with a reverse curved section 61 that prevents ink flow back from the orifice 59A to the main ink conduit portion of the pen. The pen 10A shown in FIG. 4 does not require a hydrophobic or other inhibiting coating, spreading of the writing fluid over the external surface of the pen being prevented by the reverse curved portion 61. This pen construction, however, is somewhat more costly in fabrication.

In the preferred embodiment of the invention, as described hereinabove, the ink supply system is a closed system except for the outlet opening at the orifice of the pen 10. Similar operation may be achieved using a vented ink reservoir of relatively large area and shallow depth located well above the top of the writing surface on the platen 12. A closed system is preferred, however, because it prevents accumulation of dust and dirt in the ink reservoir and because the location of the ink reservoir is not limited as in the case of a vented system. This is particularly important where it is desirable to locate the ink reservoir alongside the platen 12 in the same housing with the remainder of the operating mechanisms of the recording instrument.

The ink supply system described hereinabove permits the use of a relatively large ink supply, the ink flow rate being essentially independent of reduction of the quantity of ink in the reservoir. The system makes it possible to operate the recorder over a wide range of recording speeds without blotting or skipping. The provision for variable control of the ink flow rate also facilitates reduction in the drying time for the ink, since the ink flow can be limited to the minimum amount necessary to produce a continuous line in operation of the pen.

Hence, while preferred embodiments of the invention have been described and illustrated, it is to be understood that they are capable of variation and modification.

We claim:

1. A graphic communication receiver comprising: a recording pen; a substantially vertical recording surface; means for moving the pen vertically across said recording surface in response to a received vertical movement signal; means for moving the pen toward and away from the recording surface between a recording position and a non-recording position in response to a received pen-contact signal; ink reservoir means for storing a supply of ink under an essentially constant static pressure; a conduit connecting said ink reservoir means to the recording pen; signal-actuated valve means comprising a normally closed valve interposed in said conduit between said ink reservoir means and said pen; means for applying said pen-contact signal to said valve means to open said valve whenever said pen is moved to said recording position; signal-actuated resistance means, interposed in said conduit, for varying the effective resistance of said conduit to ink flow; and means for applying said vertical movement signal to said resistance means to increase the effective resistance thereof when said pen moves downwardly and to decrease the resistance when said pen moves upwardly across the recording surface.

2. In a graphic communication recorder of the kind comprising a recording pen, means for moving the pen omnidirectionally across a recording surface, and means for moving the pen toward and away from the recording surface between a recording position and a non-recording position, an ink supply system comprising: ink reservoir means for storing a supply of ink under an essentially constant static pressure, said ink reservoir means comprising a compressible resilient storage chamber and biasing means for applying a constant compressive force to said chamber; a conduit connecting said ink reservoir means to the recording pen in an ink supply system that is closed except at the pen; and valve means, interposed in said conduit between said ink reservoir means and said pen, for closing said conduit whenever said pen is moved to said non-recording positon.

3. A graphic communication receiver comprising: a recording pen including a tubular ink conduit portion and a nib portion communicating with and extending horizontally therefrom and ending in an outlet orifice, said nib portion having a reverse curve to prevent ink flow along the external surface thereof; a substantially vertical recording surface; means for moving the pen omnidirectionally across the recording surface; means for moving the pen toward and away from the recording surface between a recording position and a non-recording position; ink reservoir means for storing a supply of ink under an essentially constant static pressure; an ink conduit connecting said reservoir means to the conduit portion of the recording pen; and valve means, interposed in said ink conduit between said ink reservoir means and said pen, for closing said ink conduit whenever said pen is moved to said non-recording position.

References Cited by the Examiner

UNITED STATES PATENTS

| | | | |
|---|---|---|---|
| 1,541,950 | 6/25 | Heesch | 120—42.06 |
| 1,849,084 | 3/32 | Hand | 346—140 X |
| 2,536,924 | 1/51 | Fehling | 120—46 X |
| 2,582,043 | 1/52 | Krahuler | 346—140 |
| 2,882,118 | 4/59 | Fayerweather | 346—140 X |
| 2,977,180 | 3/61 | Zenner | 346—140 |
| 2,979,030 | 4/61 | Harrington. | |
| 2,995,623 | 8/61 | Scheuzger | 346—140 X |
| 3,054,109 | 9/62 | Brown | 346—140 |

FOREIGN PATENTS

| | | |
|---|---|---|
| 619,968 | 5/61 | Canada. |
| 554,308 | 6/43 | Great Britain. |
| 707,894 | 4/54 | Great Britain. |

LEYLAND M. MARTIN, *Primary Examiner.*

BERNARD KONICK, EMIL G. ANDERSON, LEO SMILOW, *Examiners.*